United States Patent
Fisher et al.

(10) Patent No.: US 11,987,753 B2
(45) Date of Patent: May 21, 2024

(54) TREATMENT OF WELL STIMULATION PROPPANTS WITH DEPRESSION ADDITIVE BASED ON PREDICTED STORAGE TEMPERATURE

(71) Applicant: Halliburton Energy Services, Inc., Houston, TX (US)

(72) Inventors: Chad A. Fisher, Cache, OK (US); Wesley John Warren, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 244 days.

(21) Appl. No.: 17/318,666

(22) Filed: May 12, 2021

(65) Prior Publication Data
US 2022/0363982 A1 Nov. 17, 2022

(51) Int. Cl.
| C09K 8/80 | (2006.01) |
| B01J 2/00 | (2006.01) |
| E21B 43/26 | (2006.01) |
| F26B 9/00 | (2006.01) |

(52) U.S. Cl.
CPC .............. *C09K 8/805* (2013.01); *B01J 2/006* (2013.01); *E21B 43/2607* (2020.05); *F26B 9/00* (2013.01)

(58) Field of Classification Search
CPC .............................. E21B 43/2607; B01J 2/006
See application file for complete search history.

(56) References Cited

U.S. PATENT DOCUMENTS

| 6,061,956 | A | 5/2000 | Hadiken |
| 6,080,330 | A | 6/2000 | Bloomer |
| 6,499,493 | B1 | 12/2002 | Keenan |
| 6,878,308 | B2 | 4/2005 | Schilling |
| 9,862,881 | B2 * | 1/2018 | Drake .................... C09K 8/805 |
| 10,316,243 | B2 * | 6/2019 | Hook ..................... C09K 8/805 |
| 2018/0134949 | A1 * | 5/2018 | Monastiriotis ........... C09K 8/52 |
| 2020/0223346 | A1 | 7/2020 | Welch et al. |

* cited by examiner

*Primary Examiner* — Catherine Loikith
(74) *Attorney, Agent, or Firm* — John Wustenberg; Parker Justiss, P.C.

(57) ABSTRACT

Apparatus for treating a wetted proppant including a device to estimate fraction of water in a wetted proppant feed of a frac proppant processing plant; a system for determining an environmental temperature at which the wetted proppant will be exposed to in the frac proppant processing plant or in storage holding an output from the frac proppant processing plant; and an additive system to apply a freezing point suppression additive to the wetted proppant in proportion to the fraction of water such that a mixture of the wetted proppant plus the freezing point suppression additive does not solidify at the environmental temperature. Also, a method for treating a wetted proppant.

16 Claims, 3 Drawing Sheets

TREATMENT OF WELL STIMULATION PROPPANTS WITH DEPRESSION ADDITIVE BASED ON PREDICTED STORAGE TEMPERATURE

BACKGROUND

Hydraulic fracturing is a well-known process including pumping a fracturing or "fracing" fluid into a wellbore of a well fracing system at an injection rate that is too high for the formation to accept without breaking. During injection, the resistance to flow in the formation increases, and the pressure in the wellbore increases to a value called the break-down pressure, which is the sum of the in-situ compressive stress and the strength of the formation. Once the formation "breaks down," a fracture is formed, and an injected fluid flows through it. From a limited group of active perforations, often a single, vertical fracture is created that propagates in two "wings" being about 180° apart and identical in shape and size. In naturally fractured or cleated formations, multiple fractures may be created and/or the two wings propagate in a tree-like pattern with increasing number of branches away from the injection point.

Fluid not containing any solid ("pad") is injected first, until the fracture is wide enough to accept a well stimulation proppant or frac proppant. The purpose of the frac proppant is to keep apart the fracture surfaces once the pumping operation ceases, the pressure in the fracture decreases below the compressive in-situ stress trying to close the fracture. In deep reservoirs, man-made ceramic beads are often included as the frac proppant to hold open or "prop" the fracture. In shallower reservoirs, sand is often included as the frac proppant.

To continually reduce well stimulation costs, sand supplied for a frac proppant has changed from proppant mined from sand mines distant (e.g., 10s, 100s or 1000s of miles) from the well fracing system site to more locally mined sand near the well fracing system. Often, after being cleaned and sorted by water, the frac proppant is dried to improve bulk flowability and reduce transport weight and costs from distant sand mines. Still, the cost of transportation from distant sand mines to the well fracing system can be half of the total frac proppant cost. It is thought that sourcing frac proppant closer to the well fracing system could reduce frac proppant costs. It is also thought that frac proppant costs could be additionally reduced by reducing or eliminating equipment for further drying of frac proppant after cleaning and sorting, other than the drying that occurs in ambient storage.

BRIEF DESCRIPTION

Figure 1:
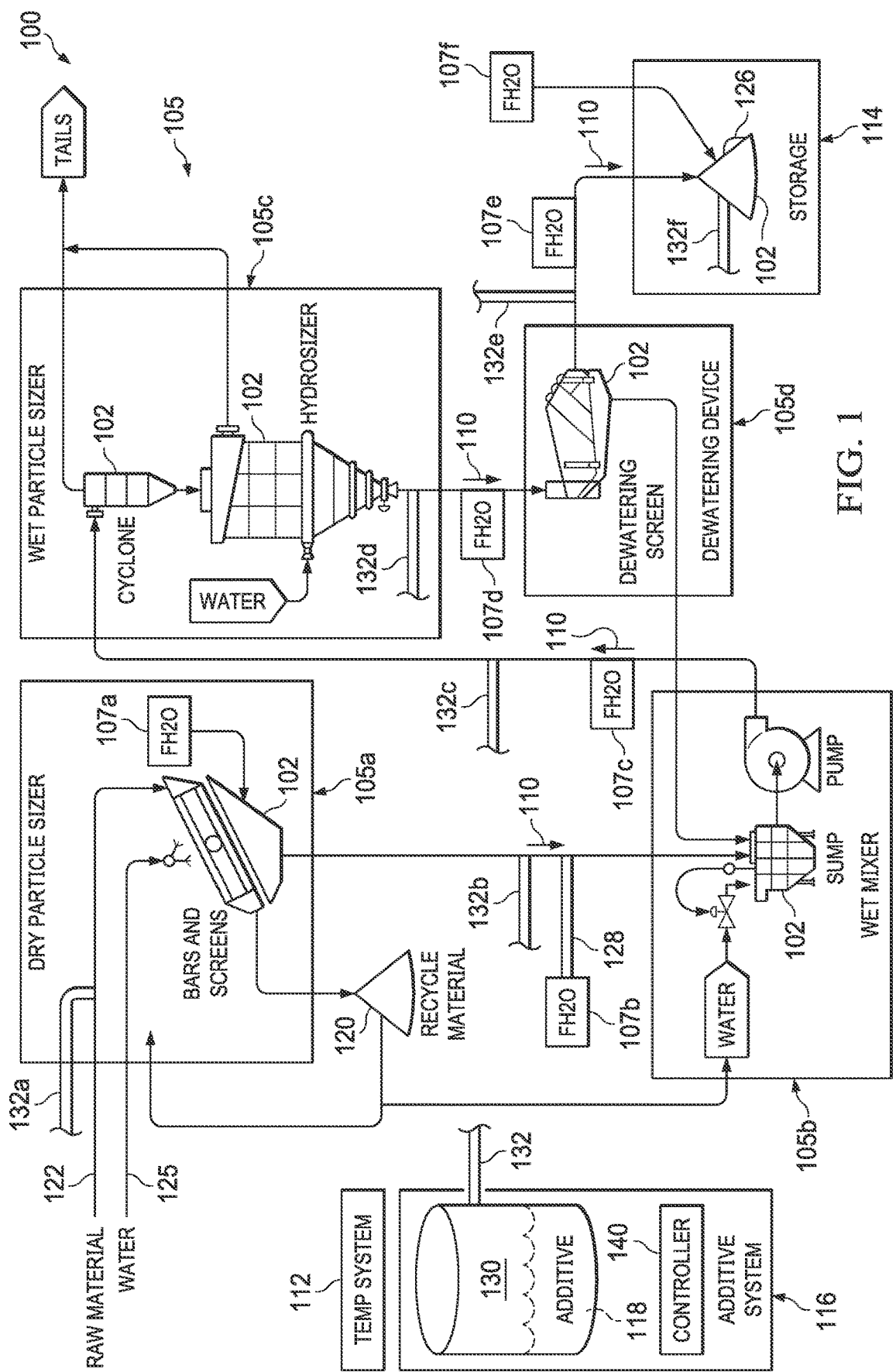
Figure 2:
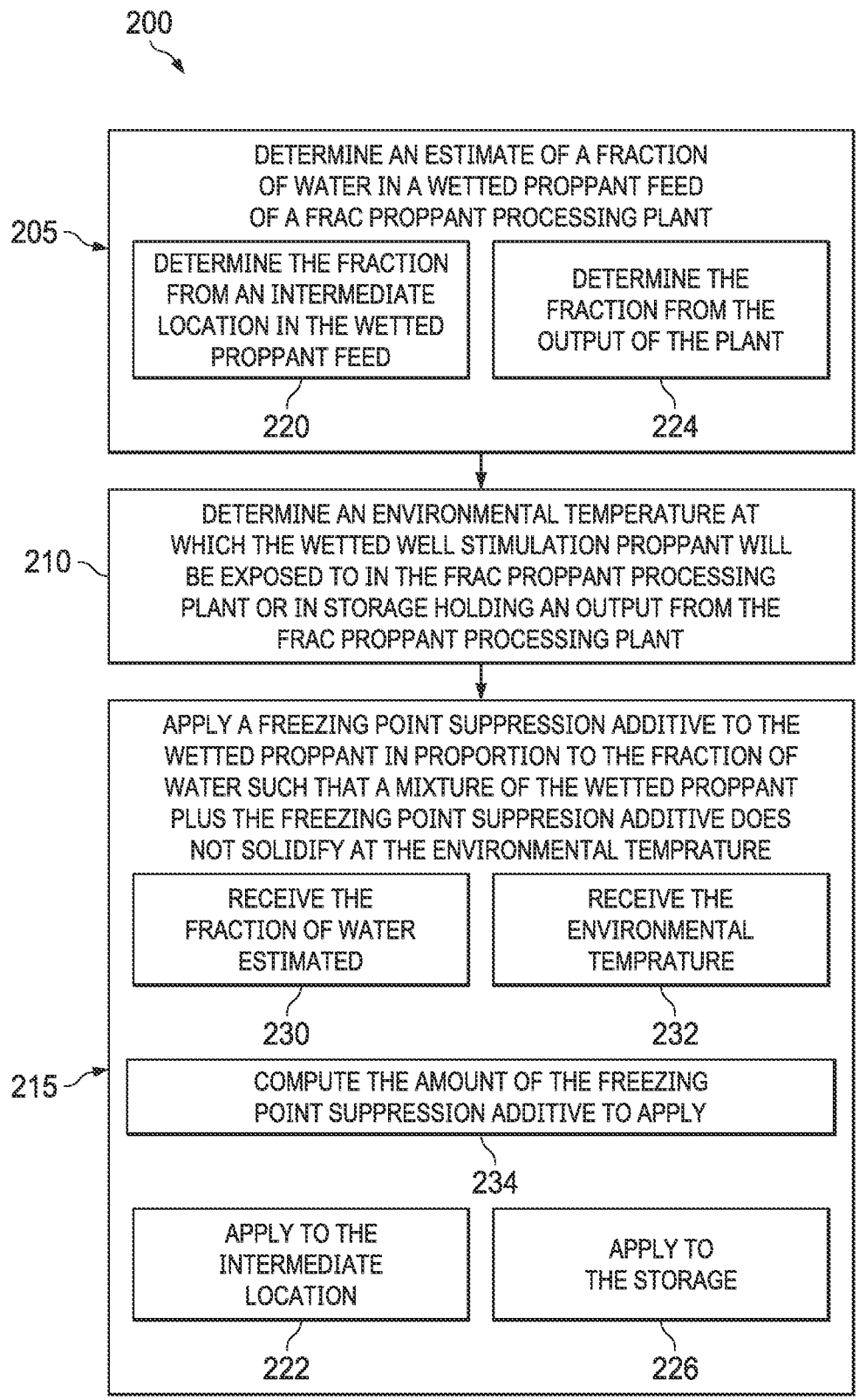
Figure 3:
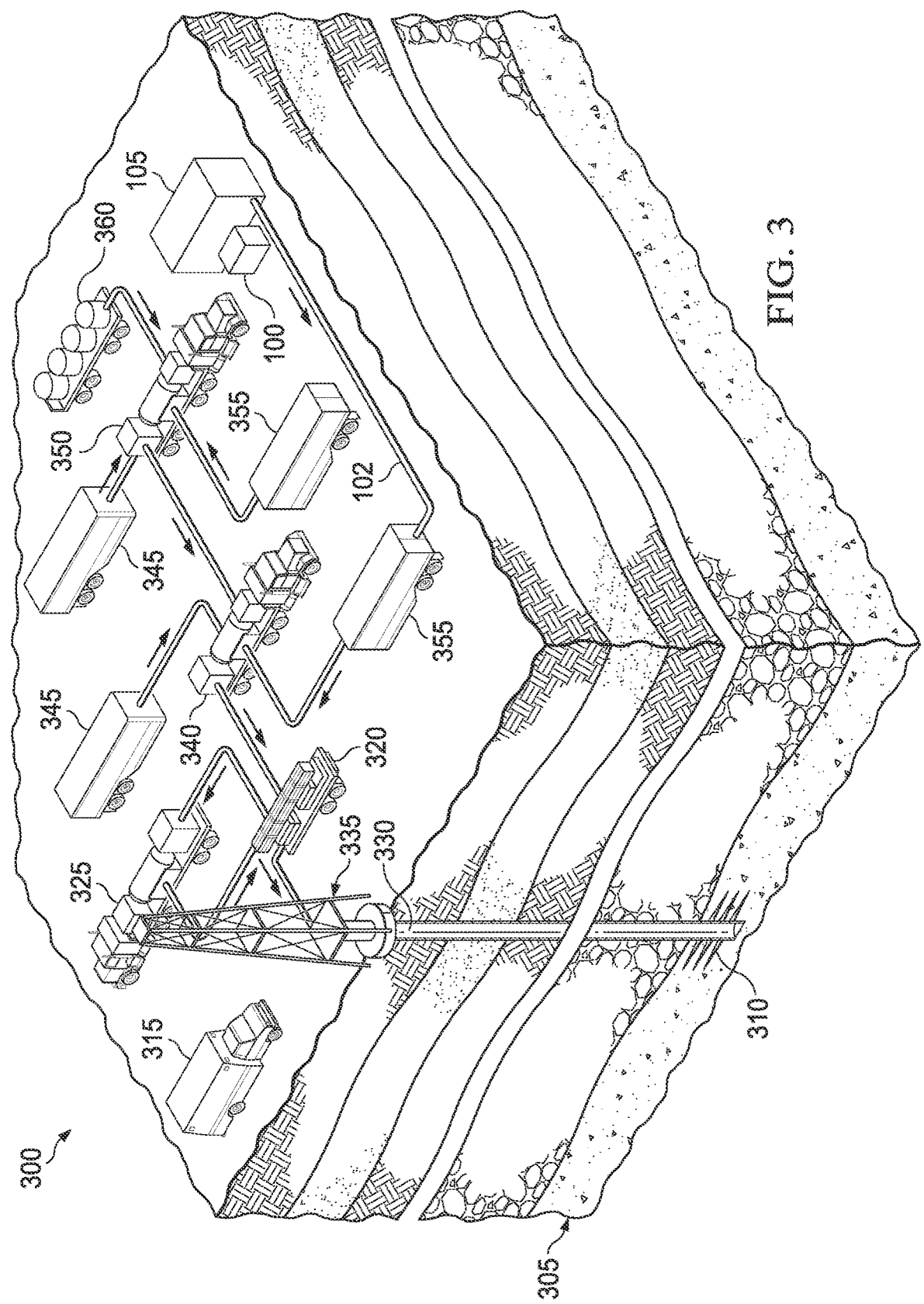

Reference is now made to the following descriptions taken in conjunction with the accompanying drawings, in which:

FIG. 1 presents a schematic block diagram of an example apparatus for treating a wetted proppant of the present disclosure shown implemented in a frac proppant processing plant;

FIG. 2 presents a flow diagram of selected steps of an example method for treating a well stimulation proppant, including implementing the method using any of the embodiments of the apparatus disclosed herein; and FIG. 3 illustrates a frac well system in which any embodiments of the apparatus and the method disclosure herein may be used.

DETAILED DESCRIPTION

As part of the present disclosure, we recognized that a wetted well stimulation proppant (e.g., wetted proppant) can have residual water contents from 0.2 to as high as 15 percent by weight (wt %) and this can cause operational challenges, due to the freezing, or near freezing, of the wet frac proppant, when ambient temperatures drops below, or near, the freezing temperature of the water, thereby limiting the frac proppant's use at such temperatures. The apparatus and method disclosed herein provides a means for using wet proppant in sub-freezing temperatures.

FIG. 1 presents a schematic block diagram of an example apparatus 100 for treating a wetted proppant 102 of the present disclosure, shown implemented in a frac proppant processing plant 105.

With continuing reference to FIG. 1 throughout, the apparatus can include a device (e.g., generally, device 107, $F-H_2O$) to estimate a fraction of water in a wetted proppant 102 feed (e.g., feed 110) of a frac proppant processing plant 105, a system (e.g., Temp system 112) for determining an environmental temperature at which the wetted proppant 102 will be exposed to, in the frac proppant processing plant, or in storage (e.g., storage 114) holding an output from the frac proppant processing plant. The apparatus 100 can include an additive system 116 to apply a freezing point suppression additive 118 to the wetted proppant in proportion to the fraction of water such that a mixture of the wetted proppant plus the freezing point suppression additive does not solidify at the environmental temperature.

The term wetted proppant, as used herein, refers to a wetted well stimulation proppant having a water content sufficiently high to deter or inhibit the flowability of the wetted proppant when exposed to temperatures near (35° F.) or below (35° F.) the freezing temperature of the water. For instance, the wetted proppant 102 being feed through, or being output from, the frac proppant processing plant 105, can have a water content of at least 0.25 wt %, and in some embodiments at least 1, 2, 5, 10 and up to 15 wt %. That is, the wetted proppant has not been feed through a proppant drying process and therefore is not dry and free-flowing (e.g., such as defined by API RP 60, Recommended Practices for Testing High-Strength Proppants Used in Hydraulic Fracturing Operations) or in a free-flowing state (e.g., such as defined by API STD 19C, Measurement of and Specifications for Proppants Used in Hydraulic Fracturing and Gravel-packing Operations).

The term wetted proppant feed, as used herein, refers to the wetted proppant at any stage in the frac proppant processing plant 105, starting from where material (e.g., solid raw source material 120, such as rock or soil mined from the ground to be processed in the plant to produce proppant) is first introduced and wetted, or recycled, into the plant, and ending at the output of the plant where the wetted proppant exits from the plant and is ready to be put into use at a well fracing system or sent to the storage 114 (e.g., a storage location for later use in the well fracing system, such as bulk storage for a time and then transferred to storage in containers) before being used at the well fracing system.

The term freezing point depression additive, as used herein, is defined as any liquid or dissolvable material that when added to water reduces the freezing point of the resulting solution (e.g., a freezing point reduction of at least 2, 5, 10, 15, 20, 25, 30, 35, or 40° C. in various embodiments).

The term solidify, as used herein, refers to temperature at which wetted proppant can no longer effectively flow through the plant (e.g., a feed flow rate of less than 10, 20, 100, 200, 500, 1000, 2000, 5000, 10,000, 20,000 lbs/min, in various embodiments and environment temperatures ranging from 40 to −40° F.) and/or cannot be applied in a frac well system (e.g., system 300, FIG. 3) at a rate needed for a fracing operation (e.g., a supply rate of at least 100, 200, 500, 1000, 2000, 5000, 10,000, 20,000 lbs/min, in various embodiments) and/or cannot be retrieved from the storage location (e.g., an angle of repose 126 of the wetted proppant in storage is equal to or greater than 35, 40, 45 or 50 degrees in some embodiments)

In some embodiments of the apparatus 100, the device (e.g., one or more of devices 107a, . . . 107d) to estimate the fraction of water in the wetted proppant can sample the wetted proppant feed 110 from an intermediate location in the wetted proppant feed.

For example in some embodiments of the apparatus 100, the device (e.g., one or more of devices 107a, . . . 107d) measures the partially treated wetted proppant 102 or recycled material (e.g., material 120) at a stage of the feed pathway in the plant 105 (e.g., at any one or more of plant components 105a, 105b, 105c, 105d) prior to being ready to be directly used or sent to the storage 114. As non-limiting examples: the device 107a may sample from a dry particle sizer 105a (e.g., raw material 122 sized using sizing bars and/or crusher screen) of the plant 105 after wetting (e.g., water 125); the device 107b may sample upstream from a wet mixer 105b (e.g., including a sump and/or pump) of the plant 105 but downstream from the dry particle sizer 105a; the device 107c may sample upstream from a wet particle sizer 105c (e.g., including a cyclone and/or hydrosizer) of the plant but downstream from the wet mixer 105b); and/or the device 107d may sample upstream from a dewatering device 105d (e.g., including a dewatering screen) of the plant but downstream from the wet particle sizer 105c.

For example in some embodiments, the wetted proppant 102 can be sampled in situ while in the feed 110 in the plant 105 by a device (e.g., any of devices 107a, . . . 107d) which can be or include a sensor (e.g., a moisture sensor using resistivity, near infrared or microwave signals to intermittently or continuously measure moisture content) that has access to the wetted proppant in the feed 105. For example, in embodiments of the apparatus 100, the device can include a sampling line (e.g., line 128 connected to the feed 110 to divert a sample of the wetted proppant from the feed through the line where the sample can be analyzed, e.g., using mobile sensor or at a laboratory station to determine the fraction of water.

Additionally or alternatively, in some embodiments, the device 107 to estimate the fraction of water in the wetted proppant can sample the wetted proppant feed 110 from an output frac proppant processing plant 105.

For example, in some embodiments, the device (e.g., device 107e) can sample the treated wetted proppant 102 from an output of the frac proppant processing plant 105, e.g., sampling downstream from a dewatering device 105d of the plant 105. For example, in some embodiments, the device (e.g., device 107f) samples the treated wetted proppant 102 from the storage 114 where the output of the frac proppant processing plant 105 is sent to.

In some embodiments of the apparatus 100, the additive system 116 can include a reservoir (e.g., reservoir 130) for containing the freezing point depression additive 118 therein and a delivery line (e.g., generally, delivery line 132) for delivering the additive 118 to the wetted proppant feed 110.

In some embodiments, the delivery line (e.g., one or more delivery lines 132a, 132b, 132c, 132d, e.g., conduits equipped with an optional sprayer in some embodiments) for delivering the additive can be located at one more intermediate locations in the wetted proppant feed 102 in the plant 105.

As non-limiting examples: the delivery line 132a may be located upstream from the dry particle sizer 105a of the plant after wetting; the delivery line 132b may be located upstream from the wet mixer 105b but downstream from the dry particle sizer 105a; the delivery line 132c may be located upstream from the wet particle sizer 105c of the plant but downstream from the wet mixer 105b; and/or the delivery line 132d may be located upstream from the dewatering device 105d of the plant but downstream from the wet particle sizer 105c.

In some embodiments, the delivery line (e.g., one or more delivery lines 132e, 132f) for delivering the additive can be located at an output of the plant 105.

As non-limiting examples: the delivery line 132e may be located to deliver additive downstream from the dewatering device 105d of the plant 105. For example, in some embodiments, the delivery line 132f may be located to deliver additive to the storage 114 where the output of the frac proppant processing plant 105 is sent to.

In some embodiments, the one or more delivery lines 132a, . . . 132f may be connected to a single common reservoir 130 while in other embodiments, the delivery lines can be connected to different reservoirs.

In some embodiments of the apparatus 100, the system 112 for determining the environmental temperature determines an ambient temperature measurement of an environment of plant 105 or the storage 114 holding the wetted proppant 102. For instance, the ambient temperature surrounding the plant 105 or the storage 114 (e.g., storage tank, a below-ground pit or an above ground mound or other outdoor containment area) can be from a temperature probe or probes located at or near the storage location.

In some embodiments, the system 112 determines the environmental temperature as an estimated future ambient temperature measurement of an environment of the plant 105 or the storage 114. For instance, the estimated future ambient temperature measurement can be from a meteorological weather report for the geographic region where the plant 105 of the storage 114 is located. For instance, the estimated future ambient temperature measurement can be from a trend line (e.g., linear trend or other extrapolation) of the ambient temperature measurements made in the vicinity of the plant or storage location.

In some embodiments, the system 112 determines the environmental temperature as a temperature measurement of the wetted proppant 192 at the plant or the storage 114. For instance, the environmental temperature can be from a temperature probe inserted in the wetted proppant 102 in the plant 105 (e.g., in the feed 110) or at the storage 114 or from a temperature probe direct to the measure the surface temperature of the wetted proppant (e.g., an infrared sensor).

In some embodiments of the apparatus 100, the device 107 for estimating the fraction of water in the wetted proppant feed 110 can include one or more resistivity, near infrared or microwave sensors arranged to measure a water content of the feed.

In some embodiment, the device 107 for estimating the fraction of water in the wetted proppant feed 110 can include a salinity sensor. For instance the device can include a salinity sensor positioned to measure a conductivity of the wetted proppant in the feed.

Knowledge of the environmental temperature and the fraction of water (and in some embodiments, the salinity, when substantial, e.g., greater than 10 g of salt/kg water) can be used to adjust the amount of additive 118 applied by the additive system 116 to suppress the freezing point of the wetted proppant.

For instance, a freezing point depression curve (e.g., a look up table or graphical plot or digital electronic equivalent, in some embodiments) for the particular additive or additives to be used as part of the system 112 can be consulted to determine the amount of additive needed to suppress the freezing point of the wetted proppant to a value below the environmental temperature.

As a non-limiting example, consider a wetted proppant feed that contains salt water with a measured salinity was 100 g/kg. From a freezing point depression curve for water have this measure of salinity, the wetted proppant would be estimated to not solidify until the environmental temperature dropped below about 7° C. If the environment temperature equaled or was expected to equal −10 C, then an additive 118 of sodium chloride salt would need to be added to increase salinity to about 160 g/kg. Once the amount of additive needed is determined per unit weight of the wetted proppant, then a proportion of additive to the wetted proppant feed in the plant or being output from the plant could be determined based on the rate of wetted proppant feed.

In some embodiments, the additive system 116 can be manually adjusted (e.g., by a plant operator) to apply the additive at the rate needed to keep the wetted proppant feed 110 or storage 114 so as to maintain the proportion of additive to the wetted proppant exiting the plant (e.g., to maintain a salinity to about 160 g/kg). In some embodiments the additive system 116 can be alternatively or additionally programed to make such calculations and adjustments.

As another non-limiting example consider an embodiment where the environmental temperature is determined to equal 0° F., the additive is propylene glycol, the faction of water of the wetted proppant is 0.1 (e.g., 10% wt/wt or vol/vol in various embodiments) and the wetted proppant feed 110 through the plant 115 is at a rate of 100 lb/min. The amount of propylene glycol additive applied to the wetted proppant feed is 2 lb/min.

For instance, in some embodiments of the apparatus 100, the additive system can further includes a controller 140 programmed to receive the fraction of water estimated by the device 107, receive the environmental temperature from the system 112, and compute an amount of the freezing point suppression additive to apply to the wetted proppant to prevent the solidifying the mixture of wetted proppant 102 and additive 118. For instance, in some such embodiments, the controller can be further programmed to determine the amount of the additive to apply to the wetted proppant in the feed in the plant or the storage. For instance, the controller can be programmed to send a control signal to deliver the amount of the additive through one or more delivery lines 132 of the additive system.

For instance, in some such embodiments, the controller can be further programmed to determines the amount of the additive to apply to the wetted proppant output from the frac proppant processing plant, based on the fraction of water, the environmental temperature, a rate of the wetted proppant feed and a cryoscopic constant of the particular additive being used.

For instance, in some such embodiments, the controller can be programed to determine the amount of the additive to apply to the wetted proppant at an intermediate stage in the plant based on the fraction of water, the environmental temperature, a rate of the wetted proppant feed and a cryoscopic constant of the particular additive being used.

The term controller, as used herein, refers to a programmable computer device (e.g., a programmable logic controller, PLC, Programmable Automation Controller, PAC, or other industrial computer familiar to one skilled in the pertinent art) adapted to receive information (e.g., inputs from the device 107 and system 112), and execute instruction from a program (e.g., a central processing unit programmed to compute an amount of the additive to deliver), and send output (e.g., a control signal) to deliver appropriate amount of additive 118 to the feed 110 or the storage 114 from the reservoir 130 via the delivery line 132.

For instance, consider again another example embodiment using propylene glycol as the additive. The system 112 for determining the environmental temperature would feed the determined or predicted environmental temperature into the controller 140, e.g., a temperature or the expected temperature of 0° F. The device 107 estimating the water fraction would feed the value to the controller. If 10,000 lb/min of wetted proppant is the feed rate through the plant and the water fraction of the wetted proppant equals 0.02 (2 w %) when leaving the plant, then the equivalent rate of water output from the plant equals 200 lb/min (e.g., 10,000 lb/min×0.02=200 lb/min). If fresh water is used as part of the wetted proppant feed in the plant and the volumetric water feed rate equal 200 lb/min then 24 gal/min of water comes out of plant as part of the wetted proppant 102 (e.g., volumetric water feed rate dividend by the density of fresh, 200 lb/min/8.33 lb/gal=24 gal/min). From the appropriate freezing point depression curve for pure water, to prevent solidification of the wetted proppant at the environmental temperature of 0° F., 35% of water/additive solution by volume is propylene glycol. The controller 140 computes from water rate and curve, the propylene glycol rate to be applied equals 12.9 gal/min (e.g., 24 gal/min water/0.65)−24 gal/min water=12.9 gal/min). Accordingly the controller sends a control signal to add 12.9 gal gal/min of propylene glycol to the wetted proppant as it exits the plant (e.g., via delivery lines 132e).

Or, consider the example embodiment where 10,000 lb/min of wetted proppant is the feed rate through the plant and the water fraction of the wetted proppant at an intermediate stage in the plant equals 0.1 (10 w %), then the equivalent rate of water output from the plant equals 1000 lb/min (e.g., 10,000 lb/min×0.1=1000 lb/min). If fresh water is used as part of the wetted proppant feed in the plant and the volumetric water feed rate equal 1000 lb/min then 120 gal/min of water passed through the intermediate stage in the plant as part of the wetted proppant 102 (e.g., volumetric water feed rate dividend by the density of fresh, 1000 lb/min/8.33 lb/gal=120 gal/min). From the appropriate freezing point depression curve for pure water, again to prevent solidification of the wetted proppant at the environmental temperature of 0° F., 35% of water/additive solution by volume is propylene glycol. The controller 140 computes from water rate and curve, the propylene glycol rate to be applied equals 64.6 gal/min (e.g., 120 gal/min water/0.65)−120 gal/min water=64.6 gal/min). Accordingly the controller sends a control signal to add 64.6 gal gal/min of propylene glycol to the wetted proppant as it passes through the plant (e.g., via delivery lines 132a . . . 132d).

These examples estimate the respective amounts of additive to apply to the output from the plant or to an intermediate stage in the plant to prevent solidification under static conditions, if the wetted proppant is not flowing, e.g., because of a shut-down in the plant (e.g., due to an accidental mechanical break-down or the need to service a component part of plant) thereby stopping the flow of the feed, or, because the wetted proppant has reached the storage and is no longer flowing or otherwise moving. In some embodiments, if the possibility of the feed through the plant not being stopped is remote (e.g., because a scheduled service interval is weeks away) and the wetted proppant feed is not expected to freeze at the environmental temperature when dynamically flowing through the plant, then the amount of additive to apply can be adjusted to equal that needed to prevent solidification of the wetted proppant in the storage thereby potentially reducing the amount of additive needed. E.g., due to the water content of the wetted proppant output from the plant being less (e.g., 2, 5, 10 times less) than the water content of the wetted proppant feed at the an intermediate stages in the plant less additive is needed.

In any of embodiments of the apparatus 100, the additive 118 can include one or more of: glycols, alcohols, sugars, or salts. Non-limiting examples include glycols, such as ethylene glycol, diethylene glycol and/or propylene glycol; alcohols such as ethanol and/or methanol; sugars such a glucose, fructose, phospho sugars, sugar polymers, and/or fructose corn syrup; water soluble salts such as sodium chloride, calcium chloride, magnesium chloride sodium formate, potassium formate, sodium acetate, and/or potassium acetate, or combinations thereof.

In any of embodiments of the apparatus 100, the wetted proppant 102 can includes one or more of: silica sand, resin-coated sand, bauxite, ceramics or combinations thereof. Non-limiting examples include magnesium silicate, glass or synthetic ceramic proppants.

In some embodiments, the apparatus 100 can be part of a frac proppant processing plant (e.g., any embodiments of the plant 105 discussed in the context of FIG. 1), while in other embodiments, the apparatus can be a standalone apparatus which can be connected to one or more components (e.g., components 105a . . . 105d) or feed lines connecting the components of the plant or moved from one plant to another plant.

In some embodiments, the apparatus 100 can be part of a well fracing system (e.g., system 300, FIG. 3). For instance the apparatus can be connected to or part of a frac proppant processing plant 105 that is part of a well fracing system.

Another embodiment of the disclosure is a method for treating a well stimulation proppant. FIG. 2 presents a flow diagram of selected steps of an example method 200 for treating a wetted proppant 102 (e.g., a well stimulation proppant), including implementing the method 200 using any of the embodiments of the apparatus disclosed herein (e.g., embodiments the apparatus 100 discussed in the context of FIG. 1).

With continuing reference to FIGS. 1 and 2 throughout, embodiments of the method 200 can include determining, e.g., by a device 107 (step 205), an estimate a fraction of water in a wetted proppant feed 110 of a frac proppant processing plant 105. Embodiments of the method 200 can include determining, e.g., by a system 112 (step 210), an environmental temperature at which the wetted well stimulation proppant will be exposed to in the frac proppant processing plant 105 or in storage 114 holding an output from the frac proppant processing plant. Embodiments of the method 200 can include applying, e.g., by an additive system 116, (step 215) a freezing point suppression additive 118 to the wetted proppant 102 in proportion to the fraction of water such that a mixture of the wetted proppant plus the freezing point suppression additive does not solidify at the environmental temperature.

In some such embodiments of the method 200, determining the estimate of the fraction of water (step 205) can include determining of the estimate of the fraction of water from an intermediate location in the wetted proppant feed 110 (step 220) and the applying of the freezing point suppression additive (step 215) can include applying to the intermediate location in the proppant feed (step 222). In some such embodiments of the method 200, the determining of the estimate of the fraction of water (step 205) can include determining of the estimate of the fraction of water from the output of the plant (step 224) and the applying of the freezing point suppression additive (step 215) can include applying to the storage 114 (step 226).

Any such embodiments of the method 200 can include the additive system with a controller 140 programmed to receive the fraction of water estimated (step 230) by the device in step 205, receive the environmental temperature (step 232) from the system determined in step 210, and compute the amount of the freezing point suppression additive to apply (step 234) to the wetted proppant to prevent the solidifying of the mixture (step 215). In some embodiments, the controller can be programmed to determine the amount of the additive to apply to the wetted proppant being output from the frac proppant processing plan (e.g., as part of step 226), and/or to determine the amount of the additive to apply to the wetted proppant at an intermediate stage in the plant (e.g., as part of step 222) at least in part based on the fraction of water determined in step 215.

FIG. 3 illustrates a well fracing system 300 in which the method and apparatus 100 and plant 105 of this disclosure may be used or be a part of. Once a payzone 305 is identified or reached, a conventional fracturing operation may be used to create fractures 310 in the payzone 305 to increase its porosity for the purpose of increasing oil or gas production. Embodiments of the system 300 can include, among other units, an operations control unit 315, a manifold unit 320, a frac pump 325, a wellbore 330, capped by a wellhead tree 335. The system 300 can also include a slurry blender system 340 where proppant (e.g., the wetted proppant 102 provided by the plant 105), chemicals, hydrated gels and other fracturing additives can be combined. The slurry blender system 340 can include one or more of: fluid tanks 345, a gel blender 350, and fracing component storage tanks 355, such as chemical and the wetted proppant storage (e.g., FIG. 1, storage 114). The storage tanks 355 and gel hydration apparatus 360 can be coupled to the slurry blender system 340 and include hydration tanks and pumps to pump the wetted proppant 102 and hydrated gel to the slurry blender system 340. As the payzone 305 is fractured, the hydrated gel is pumped along with the wetted proppant into the fractures 310 to prop the fissures open, thereby, effectively increasing its porosity.

In the drawings and descriptions, like parts are typically marked throughout the specification and drawings with the same reference numerals, respectively. The figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings; with the understanding that they serve as examples and that, they do not limit the disclosure to only the illustrated embodiments. Moreover, it is fully recognized that the different teachings of the embodiments discussed, below, may be employed separately or in any suitable combination to produce desired results.

Herein, the terms "including" and "comprising" are used in an open-ended fashion, and thus should be interpreted to mean "including, but not limited to." References to "downstream" mean towards the wetted proppant output of the plant and "upstream" means toward the raw material input into the plant.

Each of the foregoing embodiments may include one or more of the following elements singly or in combination, and neither the example embodiments or the following listed elements limit the disclosure, but are provided as examples of the various embodiments covered by the disclosure:

Element 1: an apparatus including a device to estimate a fraction of water in a wetted proppant feed of a frac proppant processing plant.

Element 2: an apparatus including a system for determining an environmental temperature at which the wetted proppant will be exposed to in the frac proppant processing plant or in storage holding an output from the frac proppant processing plant.

Element 3: an apparatus including an additive system to apply a freezing point suppression additive to the wetted proppant in proportion to the fraction of water such that a mixture of the wetted proppant plus the freezing point suppression additive does not solidify at the environmental temperature.

Element 4: wherein the device to estimate the fraction of water samples the wetted proppant feed from an intermediate location in the wetted proppant feed.

Element 5: wherein the device to estimate the fraction of water samples the wetted proppant feed from an output of the frac proppant processing plant.

Element 6: wherein the additive system includes: a reservoir for containing the freezing point depression additive therein; and/or a delivery line for delivering the freezing point depression additive to the wetted proppant feed.

Element 7: wherein the environmental temperature is an ambient temperature measurement of an environment of the plant or the storage.

Element 8: wherein the environmental temperature is an estimated future ambient temperature measurement of an environment surrounding the plant or the storage.

Element 9: wherein the environmental temperature is a temperature measurement of the wetted proppant at the plant or the storage.

Element 10: wherein the device for estimating the fraction of water includes one or more resistivity, near infrared or microwave sensors arranged to measure a water content of the wetted proppant feed.

Element 11: wherein the device for estimating the fraction of water includes a salinity sensor.

Element 12: wherein the additive system further includes a controller programmed to: receive the fraction of water estimated by the device, receive the environmental temperature from the system, and/or compute an amount of the freezing point suppression additive to apply to the wetted proppant to prevent the solidifying of the mixture.

Element 13: wherein the controller is further programmed to determine the amount of the additive to apply to the wetted proppant. being output from the frac proppant processing plant.

Element 14: wherein the controller is further programmed to determine the amount of the additive to apply to the wetted proppant at an intermediate stage in the plant based on the fraction of water, the environmental temperature, a rate of the wetted well stimulation proppant feed and a cryoscopic constant of the additive.

Element 15: wherein the additive includes one or more of: glycols, alcohols, sugars, or salt.

Element 16: wherein the wetted proppant includes one or more of: silica sand, resin-coated sand, bauxite, ceramics or combinations thereof.

Element 17: wherein the apparatus is part of the frac proppant processing plant.

Element 18: wherein the apparatus is part of a well fracing system.

Element 19 a method including determining, by a device, an estimate a fraction of water in a wetted proppant feed of a frac proppant processing plant.

Element 20 a method including determining, by a system, an environmental temperature at which the wetted proppant will be exposed to in the frac proppant processing plant or in a storage holding an output from the frac proppant processing plant.

Element 21 a method including applying, by an additive system, a freezing point suppression additive to the wetted proppant in proportion to the fraction of water such that a mixture of the wetted proppant plus the freezing point suppression additive does not solidify at the environmental temperature.

Element 22 wherein the determining of the estimate of the fraction of water is from an intermediate stage in the wetted proppant feed and the applying of the freezing point suppression additive is applying to the intermediate stage.

Element 22 wherein the determining of the estimate the fraction of water in the wetted proppant feed is from the output and the applying of the freezing point suppression additive is applying to the storage.

The foregoing listed embodiments and elements do not limit the disclosure to just those listed above, and those skilled in the art to which this application relates will appreciate that other and further additions, deletions, substitutions and modifications may be made to the described embodiments.

What is claimed is:

1. An apparatus for treating a wetted proppant, comprising:
   a device to estimate a fraction of water in a wetted proppant feed of a frac proppant processing plant;
   a system for determining an environmental temperature at which the wetted proppant will be exposed to in the frac proppant processing plant or in storage holding an output from the frac proppant processing plant; and
   an additive system to apply a freezing point suppression additive to the wetted proppant having a water content of at least 0.25 wt %, in proportion to the fraction of water such that a mixture of the wetted proppant plus the freezing point suppression additive does not solidify at the environmental temperature.

2. The apparatus of claim 1, wherein the device to estimate the fraction of water samples the wetted proppant feed from an intermediate location in the wetted proppant feed.

3. The apparatus of claim 1, wherein the device to estimate the fraction of water samples the wetted proppant feed from an output of the frac proppant processing plant.

4. The apparatus of claim 1, wherein the additive system includes:
   a reservoir for containing the freezing point depression additive therein; and
   a delivery line for delivering the freezing point depression additive to the wetted proppant feed.

5. The apparatus of claim 1, wherein the environmental temperature is an ambient temperature measurement of an environment of the plant or the storage.

6. The apparatus of claim 1, wherein the environmental temperature is an estimated future ambient temperature measurement of an environment surrounding the plant or the storage.

7. The apparatus of claim 1, wherein the environmental temperature is a temperature measurement of the wetted proppant at the plant or the storage.

8. The apparatus of claim 1, wherein the device for estimating the fraction of water includes one or more resistivity, near infrared or microwave sensors arranged to measure a water content of the wetted proppant feed.

9. The apparatus of claim 1, wherein the device for estimating the fraction of water includes a salinity sensor.

10. The apparatus of claim 1, wherein the additive system further includes a controller programmed to:
  receive the fraction of water estimated by the device,
  receive the environmental temperature from the system, and
  compute an amount of the freezing point suppression additive to apply to the wetted proppant to prevent the solidifying of the mixture.

11. The apparatus of claim 10, wherein the controller is further programmed to determine the amount of the additive to apply to the wetted proppant being output from the frac proppant processing plant.

12. The apparatus of claim 10, wherein the controller is further programmed to determine the amount of the additive to apply to the wetted proppant at an intermediate stage in the plant based on the fraction of water, the environmental temperature, a rate of the wetted well stimulation proppant feed and a cryoscopic constant of the additive.

13. The apparatus of claim 1, wherein the additive includes one or more of: glycols, alcohols, sugars, or salts.

14. The apparatus of claim 1, wherein the wetted proppant includes one or more of: silica sand, resin-coated sand, bauxite, ceramics or combinations thereof.

15. The apparatus of claim 1, wherein the apparatus is part of the frac proppant processing plant.

16. The apparatus of claim 1, wherein the apparatus is part of a well fracing system.

\* \* \* \* \*